United States Patent [19]

Wiemeyer

[11] Patent Number: 4,603,645
[45] Date of Patent: Aug. 5, 1986

[54] SEEDER WITH SOWING SHARES

[75] Inventor: Benno Wiemeyer, Lotte-Halen, Fed. Rep. of Germany

[73] Assignee: Amazonen Werke AG H. Dreyer GmbH & Co. KG, Hasbergen- Gaste, Fed. Rep. of Germany

[21] Appl. No.: 647,076

[22] Filed: Sep. 4, 1984

[30] Foreign Application Priority Data

Sep. 8, 1983 [DE] Fed. Rep. of Germany ........ 3332352

[51] Int. Cl.⁴ .............................................. B65G 11/00
[52] U.S. Cl. ............................................ 111/1; 111/73
[58] Field of Search .................... 111/1, 34, 73, 80, 86; 193/9, 29; 137/579

[56] References Cited

U.S. PATENT DOCUMENTS

| | | | |
|---|---|---|---|
| 1,116,270 | 11/1914 | Harper | 193/9 X |
| 2,214,736 | 9/1940 | Carmichael et al. | 137/597 X |
| 3,409,187 | 11/1968 | Socha | 193/29 X |
| 4,417,530 | 11/1983 | Kopecky | 111/73 |
| 4,522,291 | 6/1985 | Smick | 111/86 X |

FOREIGN PATENT DOCUMENTS

| | | | |
|---|---|---|---|
| 80067 | 10/1955 | Denmark | 111/80 |
| 575565 | 1/1930 | Fed. Rep. of Germany | 137/597 |
| 220793 | 9/1968 | U.S.S.R. | 193/29 |
| 891006 | 12/1981 | U.S.S.R. | 111/34 |

*Primary Examiner*—James R. Feyrer
*Attorney, Agent, or Firm*—Sprung Horn Kramer & Woods

[57] ABSTRACT

A seeder with sowing shares and with two separate inlets and two separate outlets for the various materials like seed and fertilizer that are to be applied. The different materials can always be conveyed as desired to one or another inlet or outlet from a reservoir on the seeder through supply hoses. Guide mechanisms for diverting the supply of materials to the separate outlets of the shares are located between the reservoirs and the outlets.

11 Claims, 7 Drawing Figures

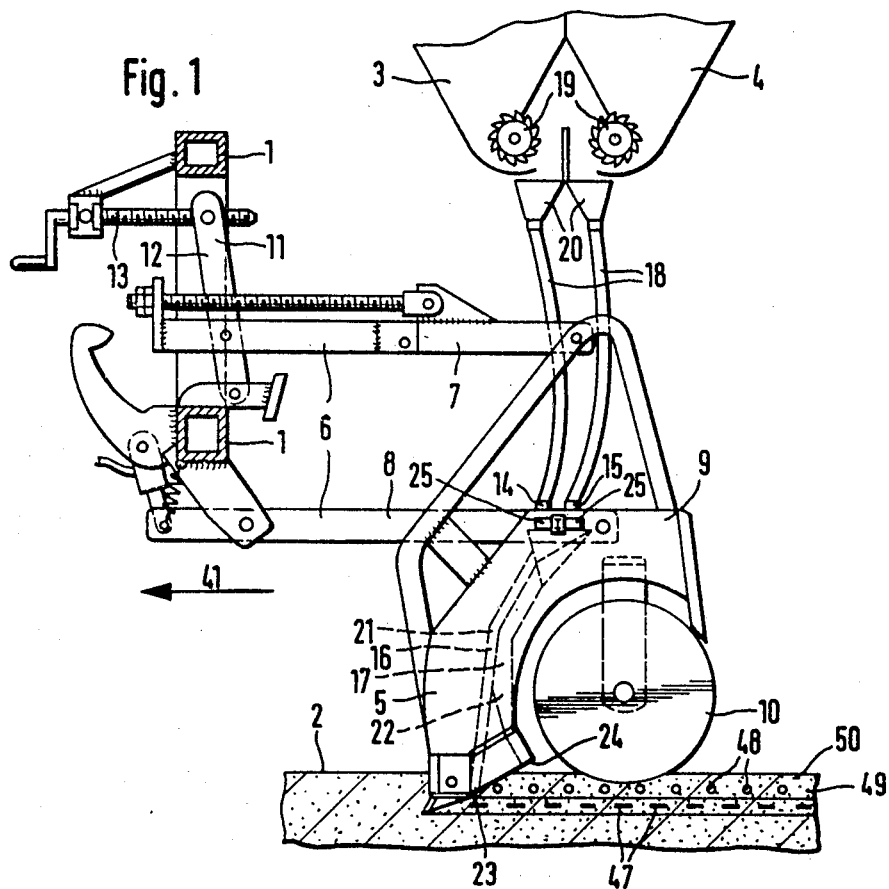
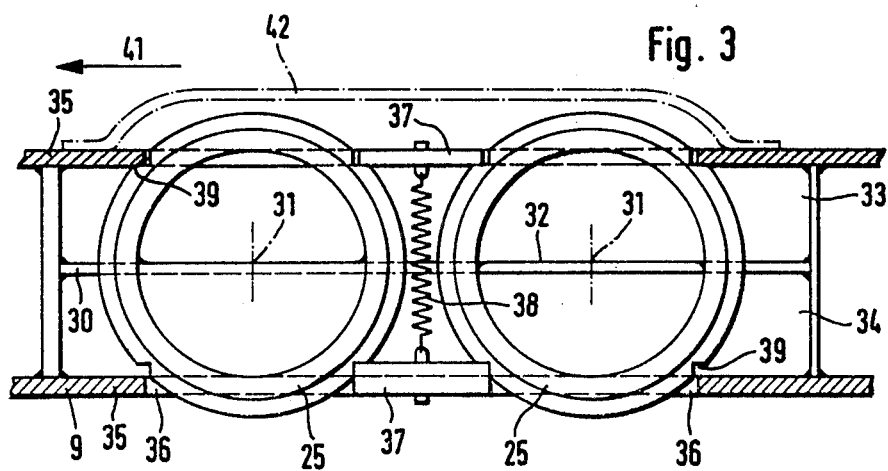

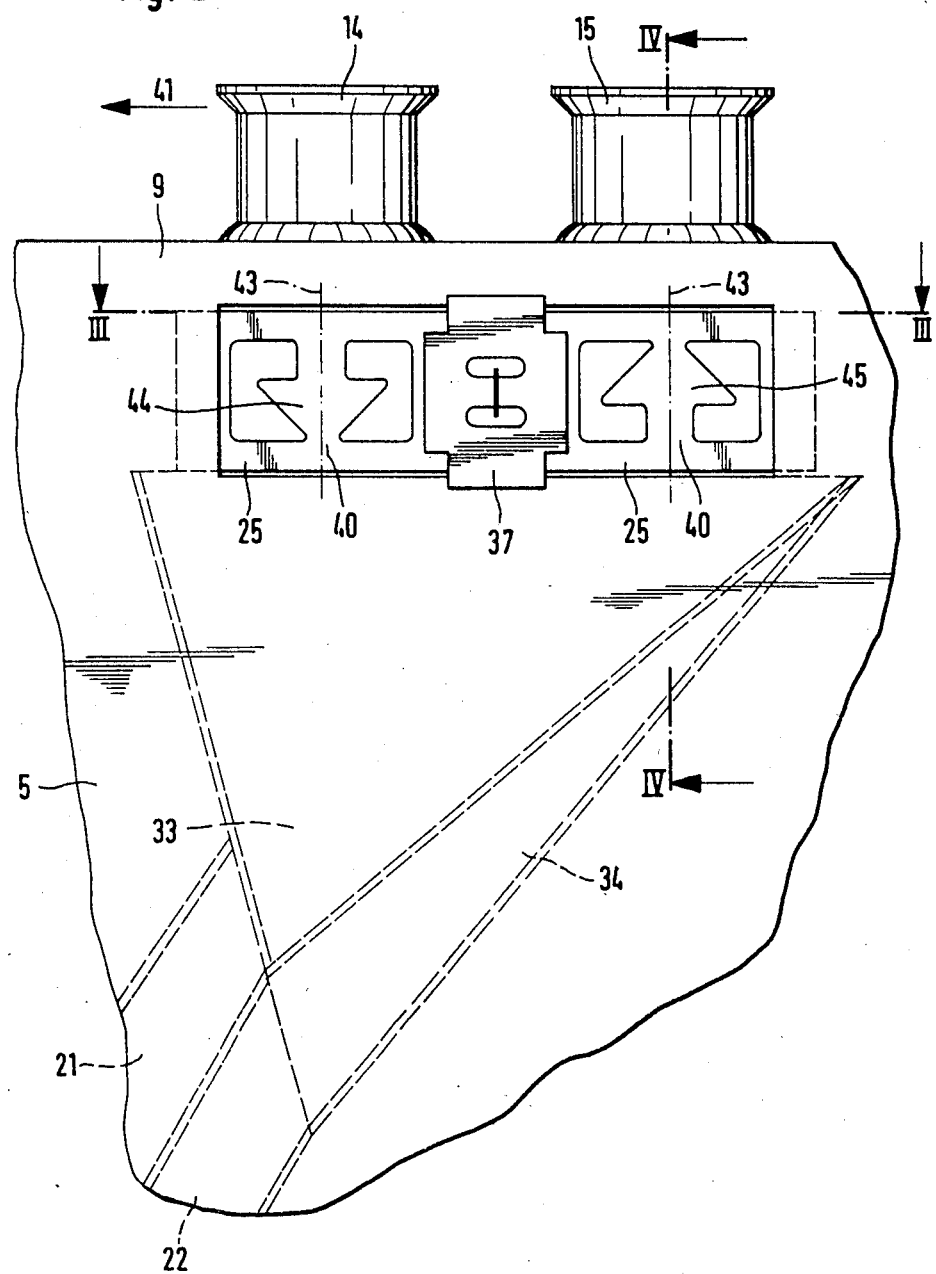

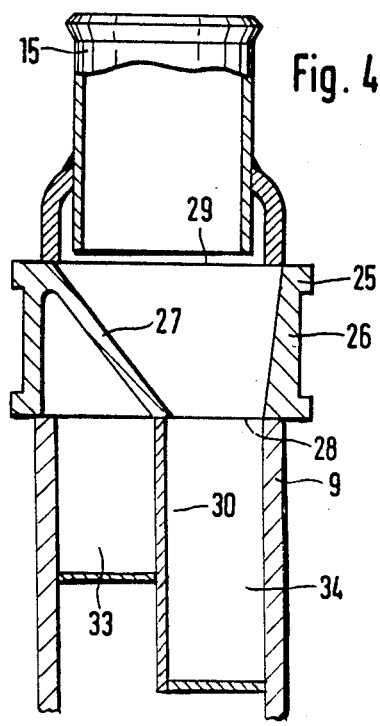
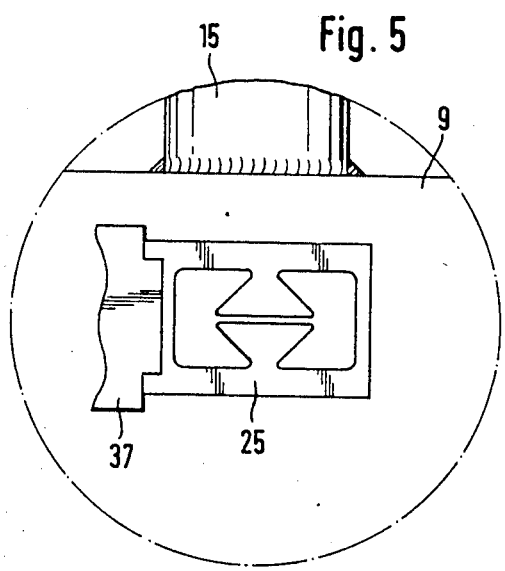
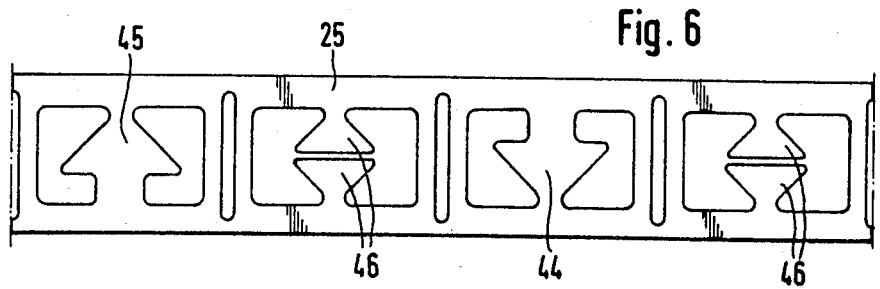

SEEDER WITH SOWING SHARES

BACKGROUND OF THE INVENTION

The present invention relates to a seeder with sowing shares and with two separate inlets and two separate outlets for the various materials like seed and fertilizer that are to be applied, whereby the different materials can always be conveyed as desired to one or another inlet or outlet from a reservoir on the seeder through supply hoses.

A seeder of this type is known from German Patent Application No. P 32 23 377. This seeder has already been proven in practice. One advantage of the seeder is that fertilizers can be deposited in the furrow separately from the seed. This prevents the seed from being attacked by the fertilizer, which is aggressive to some extent because it contains nitrogen. Seed and fertilizer can, however, be deposited together with the machine if necessary and if the type of fertilizer employed allows. The seed and fertilizer can be deposited in the furrow together by covering the rear outlet with a plate in order to divert the material to the forward outlet.

Switching the supply hoses, which are located between the flow controls, under the reservoir, and the shares allows the various materials like seed and fertilizer that are to be applied to be diverted to either the forward or to the rear outlet of the shares as desired. Switching the supply hoses has, however, turned out to be impractical because of the high expenditure of labor involved and because it is very difficult.

SUMMARY OF THE INVENTION

The object of the present invention is to provide a simple and easy means of applying seed and fertilizer either separately or together depending on operating and sowing conditions.

This object is attained in accordance with the invention by guide valve mechanisms for diverting the supply of materials to the separate outlets of the shares which are located between the reservoirs and the outlets.

The guide valve mechanisms in one preferred embodiment of the invention are located in the bodies of the shares. This is an especially simple design, which also provides that the seed or fertilizer always travels through the same supply hose all the way to the shares. This prevents seed from comiing into contact with any fertilizer that may have become deposited inside a hose.

Each guide valve mechanism is positioned below an inlet in the share bodies. This places the guide valve mechanisms in a position that is protected from contamination.

There is a vertical partition in each share body between the inlets and the outlets and below the guide valve mechanism, with the top of the partition at least approximately aligned with a line that connects the centers of the inlets. This is a simple means of positioning the guide valve mechanisms in the share bodies and appropriately diverting the seed or fertilizer into the share bodies.

Significant in this context is that all the inlets in each share can be connected to all the outlets in the share.

The cross-section of the inlet end of each guide valve mechanism in accordance with the invention is at least as large as that of the inlet associated with it and the cross-section of the outlet end of each guide valve mechanism is smaller than that of the inlet end. This ensures unobjectionable conveyance of the seed or fertilizer.

There is a cover in each guide valve mechanism that slants up to the top of the mechanism from the midline of its bottom surface and blocks off about half of its upper flow cross-section at the bottom. This also helps to ensure unobjectionable conveyance of the seed or fertilizer.

The guide valve mechanisms can be rotated and/or set below the inlets. This makes it possible to convey the materials like seed and fertilizer that are to be applied to the outlets from the shares that are appropriate to the particular sowing conditions.

The guide valve mechanisms can be rotated and/or set in a practical way around a vertical axis. This has the advantage of preventing the vertical forces that are constantly changing and constantly exerted on the shares form displacing the guide valve mechanisms.

The guide valve mechanisms can also, in accordance with the invention, be independently rotated and set into different positions inside a share body. This makes it possible to deposite seed and fertilizer separately, together, or partly together.

Finally, the guide valve mechanisms are mounted in accordance with the invention below flow controls in the reservoirs. This design can be an advantage in certain cases. This is especially true when it is desirable to set the same guide valve mechanisms together with respect to an associated share. The design will also be selected when existing seeders are equipped with adjustable guide valve mechanisms in accordance with the invention.

Some preferred embodiments of the invention will now be described with reference to the attached drawings, wherein

BRIEF DESCRIPTION OF THE DRAWINGS

FIG. 1 is a lateral section through a seeder with a sowing share in accordance with the invention, FIG. 2 is a lateral section through a sowing share with guide valve mechanisms in accordance with the invention, FIG. 3 is a section through the guide valve mechanisms along the line III—III in FIG. 2, FIG. 4 is a section through the guide valve mechanisms along the line IV—IV in FIG. 2, FIG. 5 is a side view of a guide valve mechanism in accordance with the invention, and FIG. 6 is a developed view of the outer periphery of a guide valve mechanism with various types of indicating arrows which indicate material flow directions.

DETAILED DESCRIPTION OF THE PREFERRED EMBODIMENTS

Figure 7:
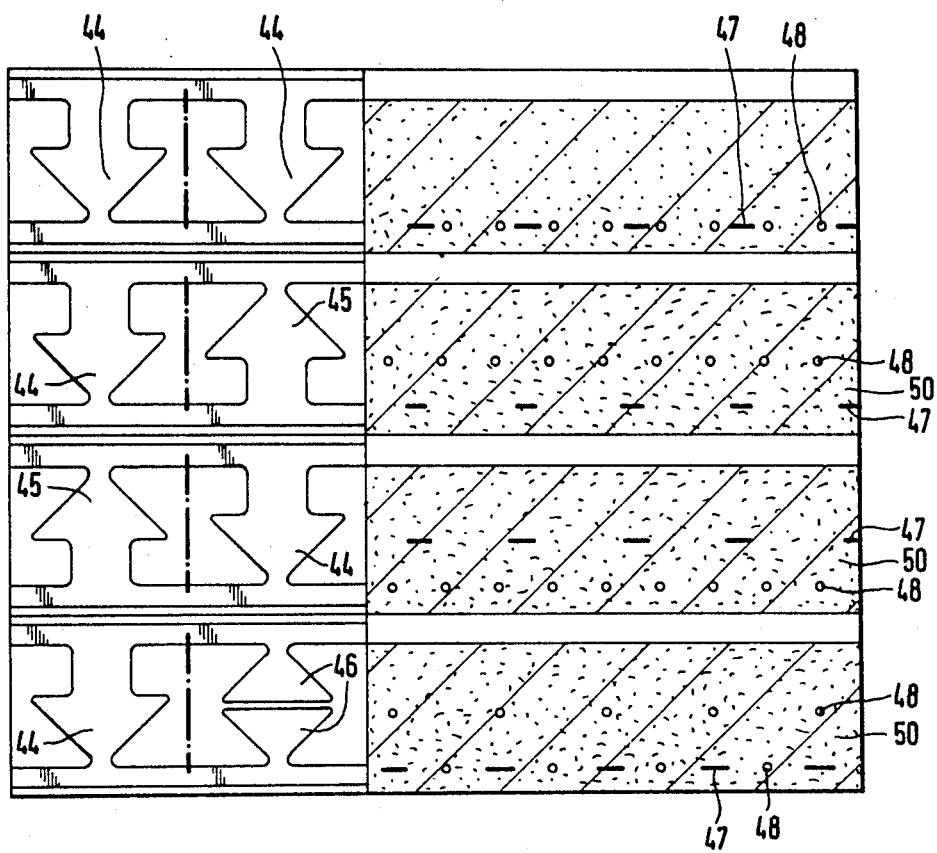
FIG. 7 is a diagram showing how the seed and fertilizer are applied with the guide valve mechanisms in various settings. The setting indications which correlate with each setting are depicted to the left of each dispensing depth pattern.

As shown in FIG. 1, the seeder has a frame 1 that rests on traveling wheels on the soil 2 in a way that is in itself known and hence not illustrate in detail. Two reservoirs 3 and 4 are mounted in a way that is not illustrated in detail on frame 1. Reservoir 3 is intended for seed and reservoir 4 for fertilizer. Sowing shares in the form of chisel shares 5 are mounted by means of parallelogram holders 6 on frame 1 in such a way that they can move in a vertical plane. Each holder 6 has an upper strut 7 and a lower strut 8, each of which is articulated at the front to frame 1 and supports the body 9 of a chisel share 5 at the rear. A depth-guide or compression roller 10 is located behind chisel share 5 and determines the depth of which the share penetrates soil 2. Parallelogram holder 6 is also fastened to a central adjusting device 11 that is employed to adjust the depth to which chisel shares 5 penetrates soil 2. Upper strut 7 is mounted for this purpose on a pivoting lever 12 that can be pivotd by means of a spindle 13. Pivoting lever 12 pivots upper strut 7 and the body 9 of share 5. This varies the position of roller 10 in relation to chisel shares 5, allowing various depths of penetration to be set.

Chisel share 5 has separate inlets 14 and 15 to supply pipes 16 and 17. The forward inlet 14 is normally employed for seed and the rear inlet 15 for fertilzier. Supply pipes 16 and 17 communicate with intake funnels 20 through supply hoses 18. Intake funnels 20 are located below flow controls 19. Flow controls 19 are located above the outlets from reservoirs 3 and 4. Thus, seed or fertilizer can be conveyed to inlets 14 and 15 through supply hoses 18. Separate guides 21 and 22 in the form of the supply pipes 16 and 17 to outlets 23 and 24 are located in each body 9. Guide 21 leads to forward outlet 23 and guide 22 to rear outlet 24. Outlets 23 and 24 are positioned one after the other at an interval to allow separate deposite of the materials and seed, which are conveyed separately to outlets 23 and 24. The material emerging from forward outlet 23 is deposited first on the bottom of the furrow. Gravity causes the furrow to tend to collapse again to a certain extent, so that some soil falls on the first material to be deposited and covers it. The material emerging from rear outlet 24 is then deposited on this layer 50 of soil before the furrow completely collapses. The layer of soil prevents the seed from being attacked by nitrogenous fertilizers.

Since guide valve mechanisms 25 are positioned below inlets 14 and 15 inside each share body 9, the guide valve mechanisms are located between reservoirs 3 and 4 and the outlets 23 and 24 from chisel shares 5. As shown in FIG. 4, each guide valve mechanism 25 consists of a cylindrical outer surface 26 and a cover 27 that slants down from above and covers the bottom half of the flowthrough cross-section of the mechanism, which is accordingly smaller at its outlet end 28 than at its inlet end 29. The cross-section of a guide valve mechanism 25 is at least as large at its inlet end 29 as that of its associated inlet 14 or 15.

There is a vertical partition 30 in each share body 9 between inlets 14 and 15 and guides 21 and 22 or outlets 23 and 24 and below guide valve mechanisms 25. As shown in FIG. 3, the top of partition 30 is aligned with a line 32 that connects the centers 31 of the inlets. Partition 30 provides two separate supply shafts 33 and 34 below guide valve mechanisms 25 that lead from inlets 14 and 15 to guides 21 and 22. Supply shaft 33 communicates with guide 21 and supply shaft 34 with guide 22. This ensures that both inlets 14 and 15 can be connected to both outlets 23 and 24 through guide valve mechanisms 25 and through supply shafts 33 and 34 as conditions dictate.

As shown in FIGS. 2-5, guide valve mechanisms 25 are inserted in windows 36 in the walls 35 of each share body 9, where they are secured by retaining plates 37 on the outside of each wall. Retaining plates 37 are maintained in place by a tension spring 38 between them. To prevent guide valve mechanisms 25 from getting displaced, each has four notches 39 symmetrically distributed along the outside and operating in conjunction with the edges of windows 36 and with retaining plates 37. The cylindrical outer surface of each guide valve mechanism 25 is also provided with conventionalized arrow displays 40 as shown in FIG. 2 and as illustrated in the developed view in FIG. 6. Arrow displays 40 indicate how or how deep the seed and fertilizer is being deposited. The arrow display 40 that is visible on the left side of share body 9 in the direction 41 of travel indicates the setting of guide valve mechanisms 25. To eliminate confusion and setting errors, a cover 42, indicated by the dot-and-dash lines in FIG. 3 can be positioned in front of guide valve mechanisms 25 on the right side with respect to direction 41 of travel.

Guide valve mechanisms 25 are mounted in windows 36 in such a way that they can rotate around a vertical vertical axis 43. Guide mechanisms 25 can be rotated into four settings, each determined by notches 39. The two guide valve mechanisms 25, which are positioned one after the other and one under each inelt 14 or 15 in each share body 9, can be rotated and set each independently of the other. This provides a number of potential combinations for setting guide valve mechanisms 25 and for depositing seed and fertilizer in the furrow.

When an arrow display with a downward-pointing arrow 44 is visible in the window 36 on the circumference of a guide valve mechanism 25, this means that the material being applied is being deposited directly on the bottom of the furrow. The material being applied is then conveyed to forward inlet 14 through supply shaft 33 and guide 21.

When an upward-pointing arrow 45 is visible in the window 36 on the circumference of a guide valve mechanism 25, this means that the material being applied is being deposited on the layer 50 of soil on top of the first material to be deposited. The material being applied is then conveyed to rear inlet 15 through supply shaft 34 and guide 22.

When two small arrowheads 46, one pointing up and the other pointing down, are visible in the window 36 on the circumference of a guide valve mechanism 25, this means that half the material being applied is being deposited directly on the bottom of the furrow and the other half on the layer 50 of soil on top of the first material to be deposited. The material being applied is then conveyed to forward inlet 14 through supply shaft 33 and guide 21 and to rear inlet 15 through supply shaft 34 and guide 22.

The four most important ways of setting guide mechanisms 25 and the resulting variations in depositing seed and fertilizer in the furrow will now be described with reference to FIG. 7, with the upper row being described first followed by the other rows in succession. The lefthand side of the left column, to the left of the heavy dot-and-dash line, illustrates the settings of forward guide valve mechanism 25, which is located under forward inlet 14 and which seed is conveyed to from reservoir 3. The righthand side of the left column, to the right of the heavy dot-and-dash line, illustrates the settings of rear guide valve mechanism 25, which is located under the rear inlet 15 and which fertilizer is conveyed to from reservoir 4. The righthand column is a series of longitudinal sections through the furrow, illustrating various modes of depositing seed and fertilizer.

The top row illustrates how seed 47 and fertilzier 48 are deposited together on the bottom of the furrow. In this case, guide valve mechanism 25 must be set such that the arrow display 40 that is visible in windows 36 has two downward-pointing arrows 44. Seed 47 and fertilizer 48 will then be conveyed from inlets 14 and 15 to the forward outlet 23 of chisel share 5 through guide valve mechanisms 25, supply shaft 33, and guide 21.

The second row illustrates how seed 47 and fertilizer 48 are deposited separately, the seed 47 on the bottom of furrow 49 and the fertilizer 48 on top of a layer 50 of soil covering the seed. In this case, guide valve mechanisms 25 must be set such that a downward-pointing arrow 44 appears in the window 36 associated with the guide valve mechanism 25 under forward inlet 14 and a upward-pointing arrow 45 in the window 36 associated with the guide valve mechanisms 25 under rear inlet 15. Seed 47 will then be conveyed from forward inlet 14 to the forward outlet 23 of chisel share 5 through guide valve mechanism 25, supply shaft 33, and guide 21 and fertilizer 48 from rear inlet 15 to the rear outlet 24 of chisel share 5 through guide valve mechanism 25, supply shaft 34, and guide 22.

The third row also illustrates how seed 47 and fertilizer 48 are deposited separately, but with the fertilizer 48 on the bottom of furrow 49 and the seed 47 on top of the layer 50 of soil. In this case, an upward-pointing arrow 45 must appear in the window 36 associated with the guide valve mechanism 25 under forward inlet 14 and a downward-pointing arrow 44 in that associated with the guide valve mechanism 25 under rear inlet 15. Seed 47 will then be conveyed from forward inlet 14 to the rear outlet 24 of chisel share 5 through guide valve mechanism 25, supply shaft 34, and guide valve mechanisms 25, and fertilizer 48 from rear inelt 15 to the forward outlet 23 of chisel share 5 through guide valve mechanism 25, supply shaft 33, and guide 21.

The fourth row illustrates how seed 47 and fertilizer 48 are deposited partly separately and partly together, with the seed 47 and half of the fertilizer 48 being deposited on the bottom of furrow 49 and the other half of the fertilizer being deposited on top of the layer 50 of soil that covers the seed and the first half of the fertilizer. In this case, a downward-pointing arrow 44 must appear in the window 36 associated with the guide valve mechanism 25 under forward inlet 14 and the arrowheads 46 pointing up and down in the window 36 associated with the guide valve mechanism 25 under rear inlet 15. Seed 47 will the be conveyed from forward inlet 14 to the forward outlet 23 of chisel share 5 through guide valve mechanism 25, supply shaft 33, and guide 21, and fertilizer 48 from rear inlet 15 through guide valve mechanism 25, half of it to forward outlet 23 through supply shaft 33 and guide 21 and the other half to rear outlet 24 through supply shaft 34 and guide 22.

It will be appreciated that the instant specification and examples are set forth by way of illustration and not limitation, and that various modifications and changes may be made without departing from the spirit and scope of the present invention. The scope of the invention is in particular not restricted to an embodiment with a rotating guide valve mechanism, which may also be in the form of a partition that can be pivoted around a horizontal axis to convey the materials being applied to the two appropriate outlets. Furthermore, the scope of the invention also includes embodiments in which the guide valve mechanisms can be positioned at any point between the supply shafts and the outlets from the shares.

What is claimed is:

1. In a field working, plural material dispensing machine comprising at least two reservoirs for dispensing at least two different materials; soil opening shares for incorporating said plural materials, each sowing share having a body defining at least two separate material inlets and outlets; a supply hose communicating each material inlet of each opener to each reservoir, the improvement comprising: guide valve means for selectively diverting the flow of each respective material from each hose to at least one of said at least two separate material outlets in each share, said guide valve means located between said reservoirs and said at least two material outlets of each share whereby material carried by each hose can be selectively diverted to exit from at least a selected one of said at least two separate material outlets of each respective share.

2. The seeder as in claim 1, wherein the guide valve means are located in the bodies of the shares.

3. The seeder as in claim 2, wherein each guide valve means is positioned below the inlet in the share bodies.

4. The seeder as in claim 2, further comprising a vertical partition in each share body between the inlets and the outlets and below the guide valve means, with the top of the partition at least approximately aligned with a line that connects the centers of the inlets.

5. The seeder as in claim 4, wherein the guide valve means includes means for communicating each of the inlets in a share each of the outlets in the respective share.

6. The seeder as in claim 1, wherein the cross-section of the inlet end of each guide valve means is at least as large as that of the outlet of each supply hose associated with it and the cross-section of the outlet end of each guide valve means is smaller than that of the inlet end.

7. The seeder as in claim 6, wherein each guide valve means includes a cover that slants up to the top of the guide valve means from the midline of a bottom surface and blocks off about half of the upper flow cross-section at the bottom of the guide valve means.

8. The seeder as in claim 1, wherein the guide valve means comprises a cylindrical guide valve member and means for rotating same relative to the share body.

9. The seeder as in claim 8, wherein the guide valve means includes means mounting the guide valve member for rotation around a vertical axis.

10. The seeder as in claim 8, wherein the guide valve means includes means mounting each of the guide valve members for independent rotatable adjustment into different positions inside each share body.

11. The seeder as in claim 1, further comprising adjustable dispensing means in the reservoirs and wherein the guide valve means are mounted below adjustable dispensing means in the reservoirs.

* * * * *